US006771252B2

(12) United States Patent
Miller et al.

(10) Patent No.: US 6,771,252 B2
(45) Date of Patent: Aug. 3, 2004

(54) SHADING OF INEQUALITIES ON A GRAPHING CALCULATOR

(75) Inventors: Michelle A. Miller, Plano, TX (US); Jian Zhang, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 322 days.

(21) Appl. No.: 09/742,864

(22) Filed: Dec. 20, 2000

(65) Prior Publication Data

US 2002/0075265 A1 Jun. 20, 2002

(51) Int. Cl.$^7$ ................................................. G09G 5/08
(52) U.S. Cl. ....................................... 345/160; 345/158
(58) Field of Search ................................ 345/160, 133, 345/440, 134, 593, 708, 158, 426, 431, 432, 418–421; 708/105; 182/201

(56) References Cited

U.S. PATENT DOCUMENTS

| | | | | |
|---|---|---|---|---|
| 5,064,024 A | * | 11/1991 | Barham | 182/201 |
| 5,281,145 A | * | 1/1994 | Sidrak | 434/215 |
| 5,303,338 A | * | 4/1994 | Handa et al. | 345/440 |
| 5,407,356 A | * | 4/1995 | Sidrak | 434/199 |
| 5,721,628 A | * | 2/1998 | Takaragi et al. | 358/518 |
| 5,739,823 A | * | 4/1998 | Akaza et al. | 345/440 |
| 5,870,097 A | * | 2/1999 | Snyder et al. | 345/426 |
| 5,907,317 A | * | 5/1999 | Tanaka et al. | 345/593 |
| 6,091,424 A | * | 7/2000 | Madden et al. | 345/619 |
| 6,167,412 A | * | 12/2000 | Simons | 708/105 |
| 6,430,731 B1 | * | 8/2002 | Lee et al. | 716/6 |

OTHER PUBLICATIONS

Hewlett Packard, Scientific Expandable HP48SX Aug. 1990.*
System of Equations 1999, Orange burg–Alhoun Technical College, p. 1,2, paragraph, 7.5.*
TI–83 Graphing calculator, Dec. 1998, pp. 22–31.*
Linear and Non–Linear Equations 1999, Section 5–8, pp. 2–9.*
DSPM Section 8.4, Systems of Linear Inequalities in Two Variables, 1999, p. 4, Paragraph, (b).*
TI–83 Graphing Calculator in Math 111 at Tacoma Community College.*

* cited by examiner

Primary Examiner—Vijay Shankar
Assistant Examiner—Prabodh M. Dharia
(74) Attorney, Agent, or Firm—Bret J. Petersen; W. James Brady, III; Frederick J. Telecky, Jr.

(57) ABSTRACT

A graphing calculator (10) or other computer based teaching tool that displays inequalities on a display screen. In contrast to prior art devices, the present invention provides displays of inequalities that are mathematically correct and consistent with non-electronic display of inequalities such as textbooks and black board representations to reinforce traditional teaching methods and help the student or user to readily see and understand the mathematical concepts involved. The display methods of the present invention are particularly useful for small, low-resolution displays that are typical of handheld computers and calculators.

14 Claims, 2 Drawing Sheets

SHADING OF INEQUALITIES ON A GRAPHING CALCULATOR

TECHNICAL FIELD OF THE INVENTION

This invention relates to computer based teaching tools such as electronic calculators, and more particularly to a calculator or other computer teaching tool having shading of mathematical inequalities.

BACKGROUND OF THE INVENTION

Electronic calculators have become a common tool for teaching students mathematics. In particular, the advantages of graphing calculators are being utilized in the classroom. Graphing calculators are characterized by a larger screen, which permits the entry of mathematical expressions in a logical format. They also permit graph displays and table displays. They have sophisticated programming capability. They often permit data transmission to other computing devices, directly or via a data storage medium, as well as data collection via various interface protocols.

Particular calculator models are often designed for particular educational levels. For example, a calculator for middle school students might have less advanced features than one designed for older students. However, regardless of the level for which a calculator is designed, a continual goal in designing them is to provide a logical and easy-to-use interface. Another area of concern is the ability to display a result on a small and comparatively low-resolution display screen.

SUMMARY OF THE INVENTION

The present invention is a computer based teaching tool or device for mathematical calculations such as a graphing calculator that displays inequalities on a display screen. In contrast to prior art devices, the present invention provides displays of inequalities that are mathematically correct and consistent with non-electronic display of inequalities such as textbooks and black board representations. This improved consistency and clarity in the display of the inequality helps to reinforce traditional teaching methods and helps the student or user to readily see and understand the mathematical concepts involved. The display methods of the present invention are particularly useful for small, low-resolution displays that are typical of handheld computers and calculators.

The calculator may otherwise be a conventional graphing calculator. Namely, the calculator screen is capable of two-dimensional displays and of displaying at least straight lines in any direction and a cursor. A key panel has keys at least capable of selecting positions of the cursor and moving the cursor horizontally or vertically on said screen. A processor is operable to execute graphing programming that instructs the processor to perform the following steps: display one or more "X=" prompts and "Y=" prompts, allow user input of an inequality for one or more prompt, display each selected inequality on the display, allow the user to select union or intersection shading of the selected inequalities.

In an embodiment of the invention a calculator or other computer based teaching tool represents a graphed inequality with a dotted line to more clearly indicate the underlying mathematical principle of the graphed line to the user.

In a further embodiment of the invention, the intersection of the graphed inequalities is shown with a different shade style so the user can clearly see the union of the inequalities.

In another embodiment, the union of the defined inequalities is graphed on the display.

DETAILED DESCRIPTION OF THE INVENTION

Figure 1:
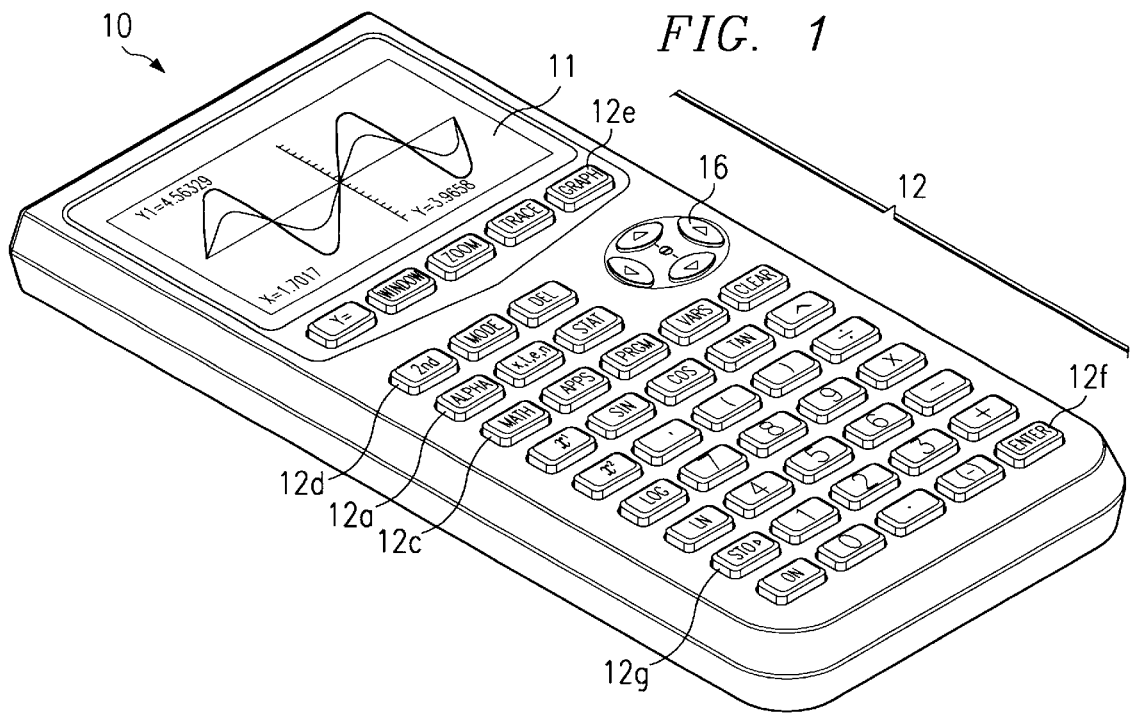
FIG. 1 illustrates the front panel of a calculator 10 having the inequality graphing features of the present invention.

FIG. 1 illustrates the front panel of a calculator 10, which has the X=Editor features of the present invention. Calculator 10 is described herein in terms of particular software and hardware features of the TI-83 Plus, a commercially available graphing calculator manufactured by Texas Instruments Incorporated. Apart from the features of the present invention, many of the features of calculator 10 described herein are typical of graphing calculators, while other features are unique to the TI-83 Plus or to its "family" of TI calculators. The use of the TI-83 Plus is for purposes of description, and does not limit the invention. The features that are the subject of the present invention could be incorporated into other calculators that provides graphical displays, or they could be incorporated into other computer based teaching tools and handheld computers.

In FIG. 1, the screen 11 of calculator 10 has a "graphical display", as that term is used herein. In addition to the ability to draw graphical displays of various types, some of the software features of calculator 10 include, software applications loading and storage, keystroke programming. It also permits data collection, display and analysis.

Various hardware features include a large pixel screen 11, which is 64×96 pixels. A keypad 12 has various keys for data and command entry, some of which are used to implement the invention and are described herein. Other features are an I/O port for data linking, a 32K byte RAM and 160K byte application space, and a unit to unit link cable connection capability.

As is typical of calculators, calculator 10 has a secondary function key, 2nd key 12a, which permits other keys to have two functions. For example, by pressing 2nd key 12a and then Stat/List key 12b, the user enters the statistical functionality. For simplicity of explanation herein, a key having two functions is referred to in terms of the function appropriate for the context, i.e., when discussing the Stat function, Stat/List key 12b is referred to as the Stat key 12b. Similarly, calculator 10 has an Alpha key 12c, which when depressed makes the other keys subsequently depressed to input an alpha character.

Figure 2:
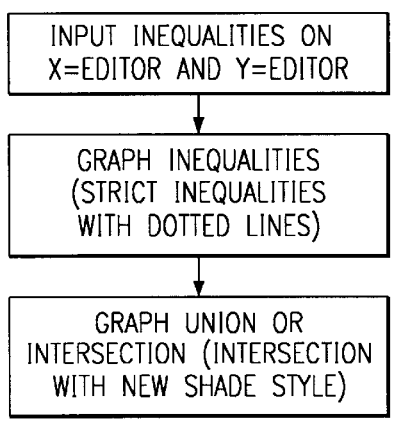
FIG. 2 illustrates the basic steps of using the calculator to use the inequality graphing features in accordance with the invention.

FIG. 2 illustrates the basic steps of using calculator 10 to show intersection and union shading of inequalities in accordance with the invention. FIG. 2 is drawn from the point of view of steps performed by the user. However, the same steps could be described in terms of activities performed by the computer. For example, steps involving entry of data by the user could also be described as receipt of data by the calculator.

The basic steps described in FIG. 2 are as follows: Invoke the Y=Editor and/or the X=Editor to allow the user to enter one or more inequalities, allow the user to enter to select or deselect each inequality, graph each selected inequality on the display, and allow the user to graph the union or intersection of the selected inequalities. The steps of selection may be repeated for each X. These steps are further described with reference to FIG. 3.

Figure 3:
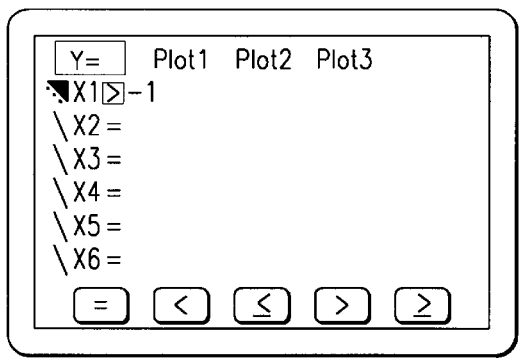
FIG. 3 illustrates an example of entering two inequalities in the Y=Editor.

FIG. 3 illustrates an example of the screen display for an X=Editor. The X=Editor is the subject of a co-filed, co-owned application. In the top left hand corner of the X=Editor display, the symbol "Y=" functions as a switch to toggle the display to the Y=Editor display. Similarly, when the display is showing the Y=Editor, the symbol "X=" is shown in this position.

The X=Editor display includes several $X_n$ lines, which allow the user to input vertical lines with equations and/or inequalities. Each $X_n$ line initially has the format of "\$X_n$=", where n is a number between 1 and 6. The symbol preceding the "X", initially a "\" symbol, represents the line type and inequality shading. The "=" symbol is in the position after the "$X_n$" and can be replaced with a relational symbol as described below.

When the cursor is moved to the position of the relational symbol for any $X_n$, the available relational symbols are displayed on the last line of the display as shown in FIG. 3. The user is then able to change the relational symbol for the cursor location by pressing the alpha key followed by the key directly below the desired symbol on the display. When the inequality symbol is selected the corresponding line type may be set to graph the inequality.

Figure 4:
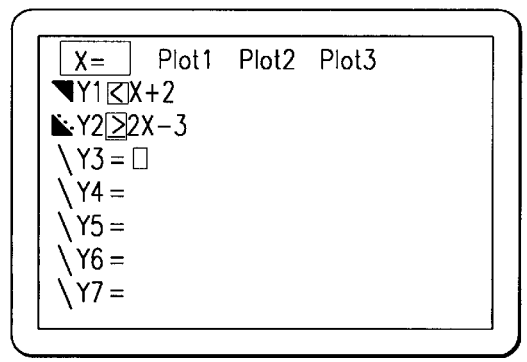
FIG. 4 illustrates an example of entering an inequalities in the X=Editor.

FIG. 4 illustrates an example of the screen display for a Y=Editor. The Y=Editor is similar to the X=Editor described above. The Y=Editor lets the user define inequality functions in terms of X. The functions may be activated for graphing by selecting and highlighting the inequality symbol.

Figure 5:
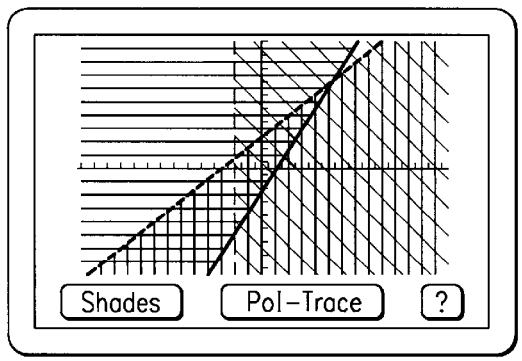
FIG. 5 illustrates the graph of the inequalities defined in FIGS. 3 and 4.

FIG. 5 illustrates a display screen of the graphs of the functions and lines described in the Y=Editor and X=Editor of FIGS. 3 and 4 with the appropriate shading. This display is a result of the user pressing the graph key after defining the lines and functions in the X=Editor and Y=Editor as described above. At this point, in the illustrated embodiment, the user is given options at the bottom of the display to either show the inequality shading or to choose the points of interest (POI) trace function.

Figure 6:
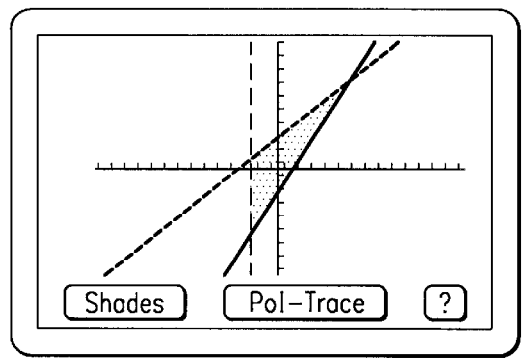
FIG. 6 illustrates the graph of the intersections of the inequalities defined in FIGS. 3 and 4.

FIG. 6 illustrates the inequality intersection shading function when the user selects this function from the screen shown in FIG. 5. The display shows the intersection of the functions and lines defined by the user and described in the previous paragraphs. In the illustrated example, the shaded portion of the graph is the intersection of X>−1, Y<X+2, and Y≦2x−3. In a preferred embodiment, the intersection is shown in a different shade style on the display so the user can easily see the intersection. Preferably, the strict inequalities are represented by dotted lines and inequalities by solid lines.

Figure 7:
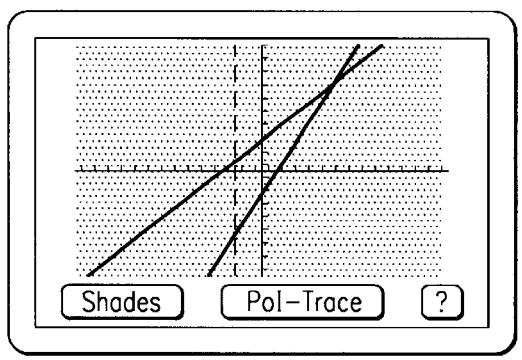
FIG. 7 illustrates the graph of the union of the inequalities defined in FIGS. 3 and 4.

FIG. 7 illustrates the union function when the user selects this function from the screen shown in FIG. 5. The display includes the graph of the functions and lines defined by the user and described in the previous paragraphs.

In a preferred embodiment, the strict inequalities are represented by dotted lines and inequalities by solid lines.

Other Embodiments

Although the present invention has been described in detail, it should be understood that various changes, substitutions, and alterations can be made hereto without departing from the spirit and scope of the invention as defined by the appended claims. For example, the invention could be incorporated into other handheld computer devices, or personal computer based teaching tools to provide to the student the same advantageous and novel learning aid claimed herein.

What is claimed is:

1. A graphing calculator that provides graphing of inequalities comprising:
   a display screen,
   a cursor on the display screen,
   a key panel having keys at least capable of selecting positions of said cursor on said display screen,
   a processor for executing programming that instructs said processor to perform the following steps:
   a) display an Y=Editor input screen on the display screen with one or more "Y=" prompts which allow a user to define one or more equations or inequalities,
   b) display the graph of one or more equations or inequalities defined by the user where strict inequalities are shown as a dotted line with shading; and
   c) allow the user to select between union and intersection shading.

2. The graphing calculator of claim 1, further comprising the step of graphing the union of the inequalities.

3. The graphing calculator of claim 2, wherein the union of the inequalities is graphed in a different style shading.

4. The graphing calculator of claim 1, further comprising the step of graphing the intersection of the inequalities.

5. The graphing calculator of claim 4, wherein the intersection of the inequalities is graphed in a different style shading.

6. A computer based mathematics teaching tool that provides an X=Editor comprising:
   a screen capable of displaying at least straight lines in any direction and a cursor;
   a key panel having keys at least capable of selecting positions of said cursor on said screen;
   a processor for executing programming that instructs said processor to perform the following steps:
   a) display an Y=Editor input screen on the display screen with one or more "Y=" prompts which allow a user to define one or more equations or inequalities,
   b) display the graph of one or more equations or inequalities defined by the user where strict inequalities are shown as a dotted line with shading and
   c) allow the user to select between union and intersection shading.

7. The computer based mathematics teaching tool of claim 6, further comprising the step of graphing the union of the inequalities.

8. The computer based mathematics teaching tool of claim 7, wherein the union of the inequalities is graphed in a different style shading.

9. The computer based mathematics teaching tool of claim 6, further comprising the step of graphing the intersection of the inequalities.

10. The computer based mathematics teaching tool of claim 9, wherein the intersection of the inequalities is graphed in a different style shading.

11. A software user interface for a graphing calculator having the following steps:

a) providing an input display to allow the user to define a plurality of equations, inequalities and vertical lines, b) graph the defined equations, inequalities and vertical lines, where strict inequalities are shown as a dotted line with shading c) allow the user to select between union and intersection graphs of the plurality of inequalities.

12. The user interface of claim 11, wherein said processor is further programmed to input equations, inequalities and lines using a Y=Editor and an X=Editor.

13. The user interface of claim 11, wherein the choice of the intersection display by the user results in graphing the intersection of the plurality of inequalities in a different shade style than the inequalities.

14. The user interface of claim 11, wherein the choice of the union display by the user results in graphing the union of the plurality of inequalities in a different shade style than the inequalities.

* * * * *